United States Patent [19]
Recalde

[11] Patent Number: 5,718,538
[45] Date of Patent: Feb. 17, 1998

[54] VERTICAL REEL PIPE LAYING VESSEL

[75] Inventor: Carlos E. Recalde, Irvine, Calif.

[73] Assignee: J. Ray McDermott, S.A., New Orleans, La.

[21] Appl. No.: 742,615

[22] Filed: Feb. 3, 1997

Related U.S. Application Data

[62] Division of Ser. No. 248,324, May 24, 1994, Pat. No. 5,573,353.

[51] Int. Cl.$^6$ ............................................. F16L 1/04
[52] U.S. Cl. ........................................ 405/168.1; 405/168.3
[58] Field of Search .......................... 405/168.1, 168.3, 405/168.4, 166, 158, 169–171, 168.2

[56] References Cited

U.S. PATENT DOCUMENTS

| | | | |
|---|---|---|---|
| 3,331,212 | 7/1967 | Cox et al. | 405/168.1 |
| 3,641,778 | 2/1972 | Gibson | 405/168.1 |
| 3,685,306 | 8/1972 | Mott | 405/168.3 |
| 3,982,402 | 9/1976 | Lang et al. | 405/168.3 |
| 4,243,345 | 1/1981 | Cha et al. | 405/168.3 |
| 4,961,671 | 10/1990 | Recalde | 405/168.3 |

FOREIGN PATENT DOCUMENTS

| | | | |
|---|---|---|---|
| 2095787 | 10/1982 | United Kingdom | 405/168.1 |

*Primary Examiner*—Dennis L. Taylor
*Attorney, Agent, or Firm*—Robert J. Edwards; D. Neil LaHaye

[57] ABSTRACT

A vertical reel pipelaying vessel having a vertical pipe storage reel rotatably positioned aft of midship and a vertical aligner wheel positioned forward of the reel. A guide means includes supports for the aligner wheel on the vessel to permit rotational movement about the axle of the aligner wheel. A moon pool is positioned forward of the reel. A direction means is provided for pivoting the aligner wheel over the moon pool to allow pipe takeoff forward of the axis of the aligner wheel and into the moon pool. The aligner wheel is provided with strain gauges along the axle to measure directly the tension of the pipeline being unspooled and passing into the water through the moon pool. A pipe straightener to apply independent transverse forces to the pipe remote from the aligner includes an endless track with rollers and sprockets in order to apply a first force at the pipeline and aligner wheel contact and a second force to the pipeline after the pipe takeoff from the aligner to bend the deformed pipeline to become straight. A transverse shifting assembly shifts the vertical aligner wheel, the supporting structure for the aligner wheel as well as the direction means for pivoting the aligner wheel. The transverse shifting assembly operates athwartship. A pipeline A&R clamp with engagement latch, shells and slips is provided to hold the pipeline after it leaves the aligner wheel and before it enters the water.

4 Claims, 11 Drawing Sheets

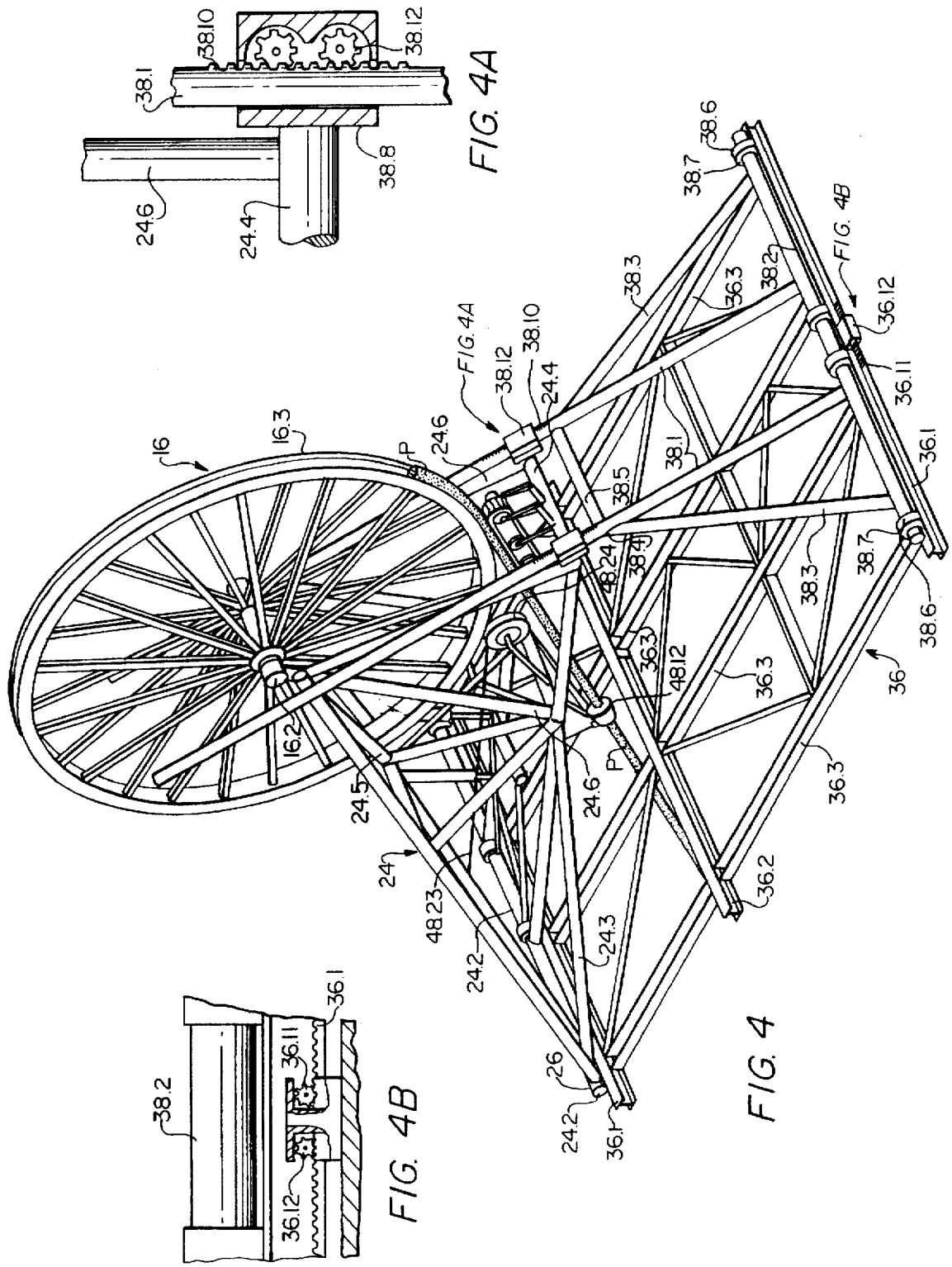

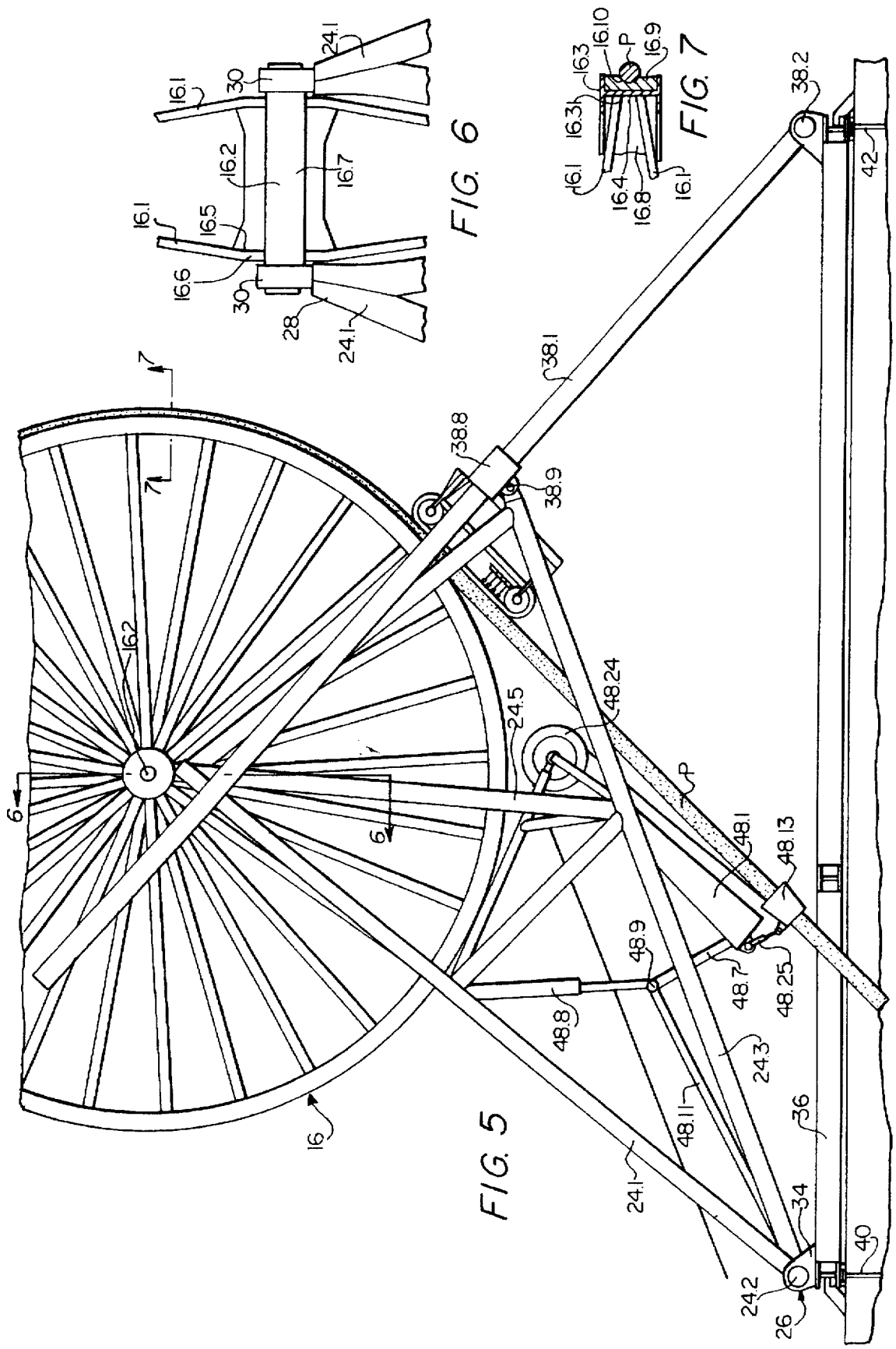

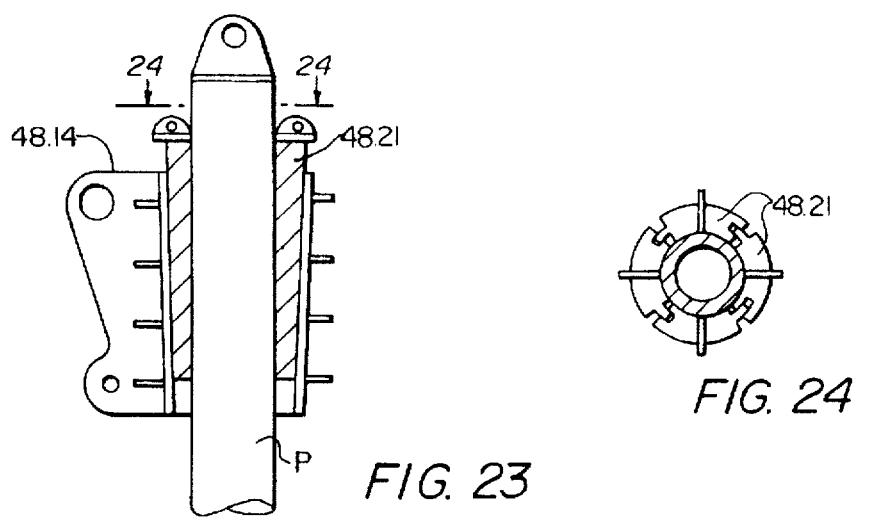
FIG. 23
FIG. 24
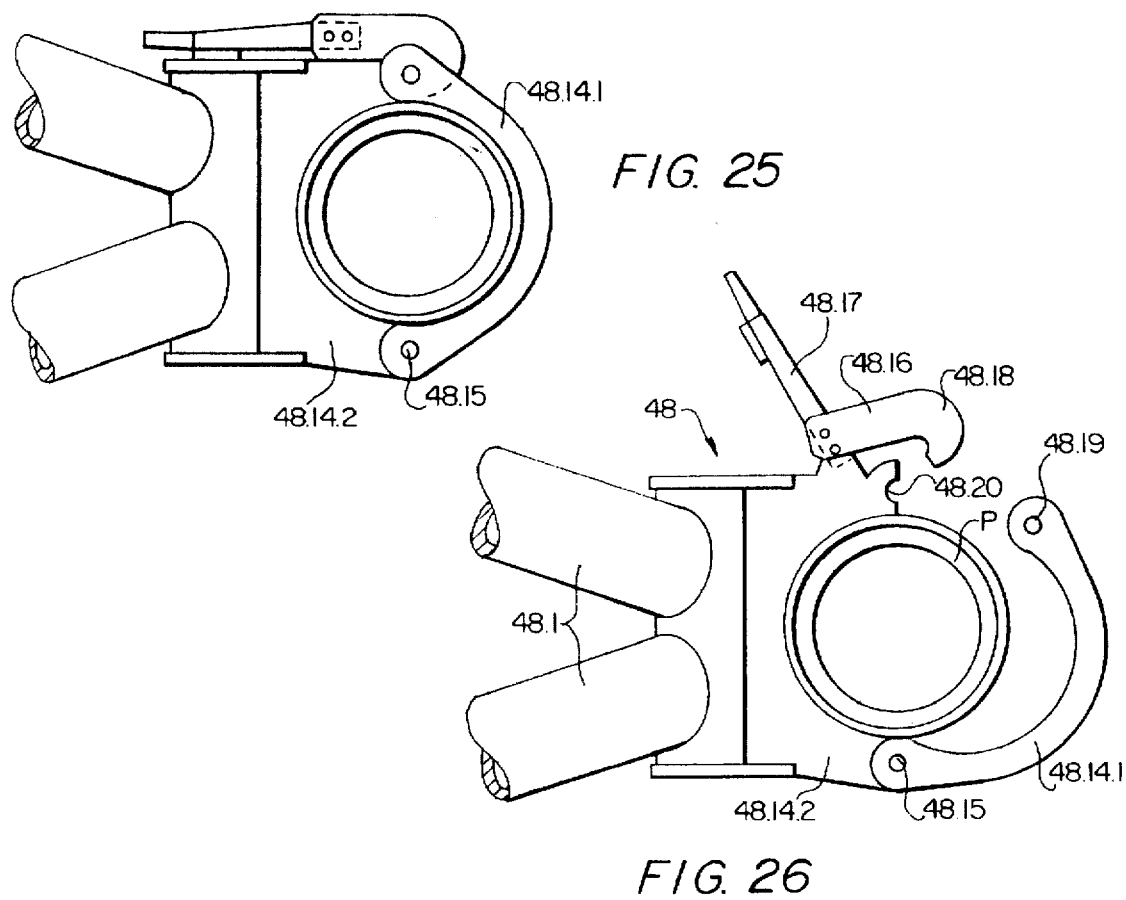
FIG. 25
FIG. 26

VERTICAL REEL PIPE LAYING VESSEL

This application is a division of application Ser. No. 08/248,324, May 24, 1994 now U.S. Pat. No. 5,573,353.

BACKGROUND OF THE INVENTION

1. Field to Which the Invention Relates

This invention relates to a pipe laying vessel having a vertical pipe storage reel. In particular the present invention is directed to a water borne vessel that is self-propelled and directed for laying pipe at the bottom of a body of water. The vertical storage reel includes pipe that is spooled onto the reel for continuous pipe laying. The pipe is unspooled from the reel and directed towards the seabed where it subsequently may or may not be buried.

2. The Known Prior Art

Pipelines are laid offshore on a seabed for the purposes of transporting oil and gas from or between offshore platforms embodying subsea wells to onshore facilities. Such offshore subsea pipelines are common, for instance, in the Gulf of Mexico but are not limited to that geographic area. In the past, such pipelines have been installed solely to transport oil and gas but recently such subsea lines have been installed to transport other products such as water or slurries of a variety of materials. The traditional method that had been in use for many years to install a subsea pipeline is by the method often referred to as "stove-piping". with this method individual joints of pipe are transported to pipelaying vessels offshore where they are joined by welding prior to their descent to lay on the sea bottom. Each length of pipe may be as long as 80 feet but before any of the pipeline is paid out the descent of the pipeline to the bottom is not continuous because each new pipe length has to be welded onto the previous pipe length before it can pass from the pipe laying vessel. It is obvious that the stove-piping method is cumbersome, time consuming and unwieldly and until the advent of the vertical storage reel, the costs for pipelaying projects were extremely high due to the premium rates demanded by offshore personnel. Because of the slow progress of pipelaying in accordance with prior art methods, and the uncertainties that weather conditions would not hold for any extended period of time rendered the entire pipe laying operation subject to being achieveable only under the most harsh and unsafe conditions. The alternative was to shut down to await more acceptable weather but continue to endure huge fixed costs in personnel and equipment.

Additional problems found in prior art pipelaying vessels that produce pipelaying at low departure angles. Such laying of pipelines was realized by means of pontoons called "stingers" that support the pipeline to a required departure angle. These low departure angles are a limiting characteristic of conventional methods. Increasing the departure angle of the pipeline significantly reduces the amount of tension to maintain a desired geometry for a prescribed water depth and pipeline weight.

An entirely new pipelaying vessel concept arose with the prospects of joining the pipes onshore and storing them on a horizontally placed reel on a floating vessel. This format significantly reduced offshore pipeline deployment time and therefore costs. However, low departure angles still limited the maximum water depth and in addition, as the relatively small size of the pipeline storage reel permanently deformed the pipeline, straightening of the pipeline before its deployment became necessary.

The deformation inherent in the horizontal pipeline storage reel was the problem because the pipeline bent about a vertical plane around the horizontally placed storage reel and during the laying procedure as bending occurred around the horizontal plane of the pipeline biaxial bending was induced. This biaxial bending was difficult to control or eliminate from the line.

Well over a decade ago efforts were made to resolve some of these problems and build the first dynamically positioned reel ship using a vertical storage drum upon which the pipe was spooled and which therefore eliminated the biaxial bending and significantly increased the departure angle of the pipeline. A number of U.S. patents have been directed to this concept and include amongst others, U.S. Pat. Nos. 4,345,855, 4,340,322, 4,297,054, 4,269,540 and 4,230,421.

The prior art approach as embodied in the foregoing patents included a vertical reel pipelaying ship in which a large reel of spooled continuous pipe was located amidships and a stern ramp with an adjustment between 20° to 60° receives the pipe as it is unspooled. The ramp included a number of supporting elements in order to handle the pipeline as it is unspooled from the vertical reel.

An aligner was included in the ramp of the prior art vertical reel pipelaying vessel and the aligner included a series of closely spaced hourglass rollers or a conveyor-type belt to support the pipeline. The curvature of the aligner was slightly larger than the radius of the reel permanently deforming the pipeline. The aligner also provided a transition for the pipeline between the reel and the ramp and as its name implies, it also permitted the alignment of the pipeline to the vertical reel during the spooling operation.

The ramp also includes a straightener that consists of a series of tractor-type tracks supporting and forcing the pipeline, during lay into a reverse curvature. The assembly consists of two bottom tracks and another top track, bending the pipeline at three points. The reverse radius of curvature is forced upon the line by the action of the top track bearing between both bottom tracks. The aligner feeds the oncoming pipeline at a particular angle on top of the first bottom track that is set slightly higher than the second bottom track. The top track then bends the pipeline to the required reverse radius of curvature. Thereafter, the pipeline should be straight and parallel to the ramp.

A tensioner is also a required element of this prior art ramp, which as in all traditionally designed offshore pipelaying vessels provides all the required laying tension to the pipeline to permit the handling of the pipe by the pipelaying vessel during spooling and laying operations. The tensioner provides some of the tension on the line with the reel providing the required difference. The tensioner also shares the lower track with the straightener. A second adjustable top track presses on the line providing enough compression to develop the necessary friction between the line in the tracks. This friction translates into tension on the line.

All offshore pipelay operations involve abandoning and recovering the pipeline using a holding or clamping mechanism. For reel pipe laying, this mechanism is generally referred to in the art as an A&R clamp that performs the operations of clamping the pipeline for installation of the supporting head. The A&R clamp is typically a device comprising a series of inflatable bags designed for each pipeline size inside rigid half shells. Pressurizing the bags compress the pipeline and clamps it to the support structure.

The last structure supporting the pipeline before its entry into the water is a stern roller. Its function is to restrain the pipeline from jumping out of the ramp and to provide a reference point for laying the pipeline. The pipelay operator on the vessel maintains the pipeline at a constant height of 6 inches above the stern roller. This position as well as the known ramp angle permits the definition of the geometric characteristics of the suspended pipeline. Therefore tension is not a parameter that the operator controls. Rather it is a consequence of the geometry of the system. This known geometry permits the calculation of structural parameters therefore controlling the ideal stress level of the pipeline.

SUMMARY OF THE INVENTION

The vertical reel pipelaying vessel having the vertical pipe storage reel rotatably positioned aft of midship and the vertical aligner wheel positioned forward of the reel for receiving the pipe. A guide means includes supports for the aligner wheel on the vessel permit rotational movement about the axle of the aligner wheel. A moon pool may be positioned forward of the reel and direction means, also part of the guide means, is provided for pivoting the aligner wheel over the moon pool to allow a pipe takeoff angle between about 42° or less to about 88° forward of the axis of the aligner wheel and into the moon pool. The aligner wheel is provided with strain gauges along the axle to measure directly the tension of the pipeline being unspooled and passing into the water through the moon pool. A pipe straightener to apply independent transverse forces to the pipe on the side of the pipe remote from the aligner includes an endless track with rollers and sprockets in order to apply a first force at the pipeline and aligner wheel contact and a second force to the pipeline after the pipe takeoff from the aligner to bend the deformed pipeline to become straight. A transverse shifting assembly shifts the vertical aligner wheel, the supporting structure for the aligner wheel as well as the direction means for pivoting the aligner wheel. The transverse shifting assembly operates athwartship. A pipeline A&R clamp with engagement latch, shells and slips is provided to hold the pipeline after it leaves the aligner wheel and before it enters the water.

THE DRAWINGS

FIG. 4 is a perspective view of the vertical aligner wheel, the support means for the aligner wheel, including the frame, the direction means, including the jactuator and struts, and a portion of the transfer shifting assembly.

FIG. 4A is an enlarged view of area 4A of FIG. 4 illustrating the housing, rack and gear arrangement to raise and lower the frame along the tubular struts.

FIG. 4B is an enlarged view of area 4B of FIG. 4 illustrating the rack and pinion arrangement to move the flat bed athwartship to maintain the alignment of the wheel aligner with the unspooling pipeline.

FIG. 5 is a side elevational view, partly broken away, of the view shown in FIG. 3 on a larger scale to illustrate the pipe straightener and continuous track as well as the pipe clamp.

FIG. 6 is an enlarged view taken along lines 6—6 of FIG. 5 illustrating the axle and cross-sectional shape of the aligner wheel.

FIG. 7 is a cross-sectional view, partly broken away, taken along lines 7—7 of FIG. 5 to illustrate the circumferential rim of the aligner wheel and its cooperation with the pipeline.

FIG. 23 is an elevational view partly in cross-section of the pipe clamp including the pipeline being held in place.

FIG. 24 is a cross-sectional view along lines 24—24 of FIG. 23.

FIG. 25 is a plan view of the pipe clamp including the engagement latch.

FIG. 26 is a view similar to FIG. 25 but showing the engagement latch in the open position.

DESCRIPTION OF THE PREFERRED EMBODIMENT

In General

Figure 1:
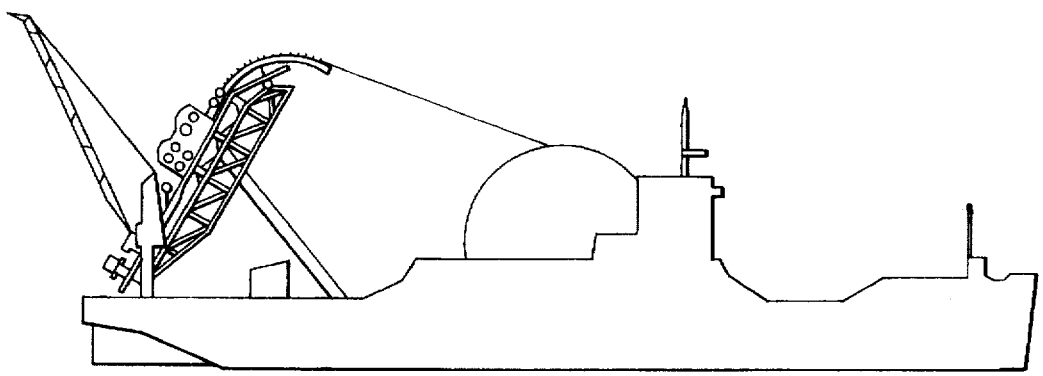
FIG. 1 is a horizontal elevation of the best known prior art illustrating the vertical reel and ramp with aligner, straightener and tensioner.
Figure 2:
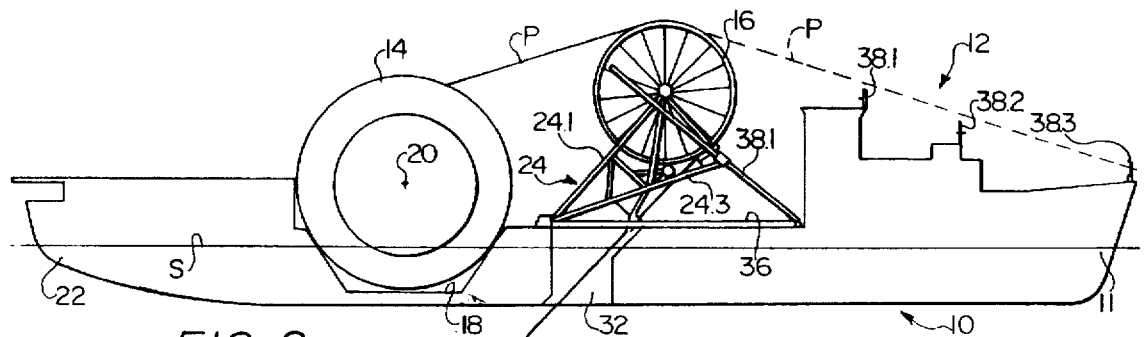
FIG. 2 is a horizontal elevation of the pipelaying vessel of the present invention illustrating the vertical reel and aligner wheel with supporting structure positioned over the moon pool through which the pipeline is passed into the seawater.
Figure 3:
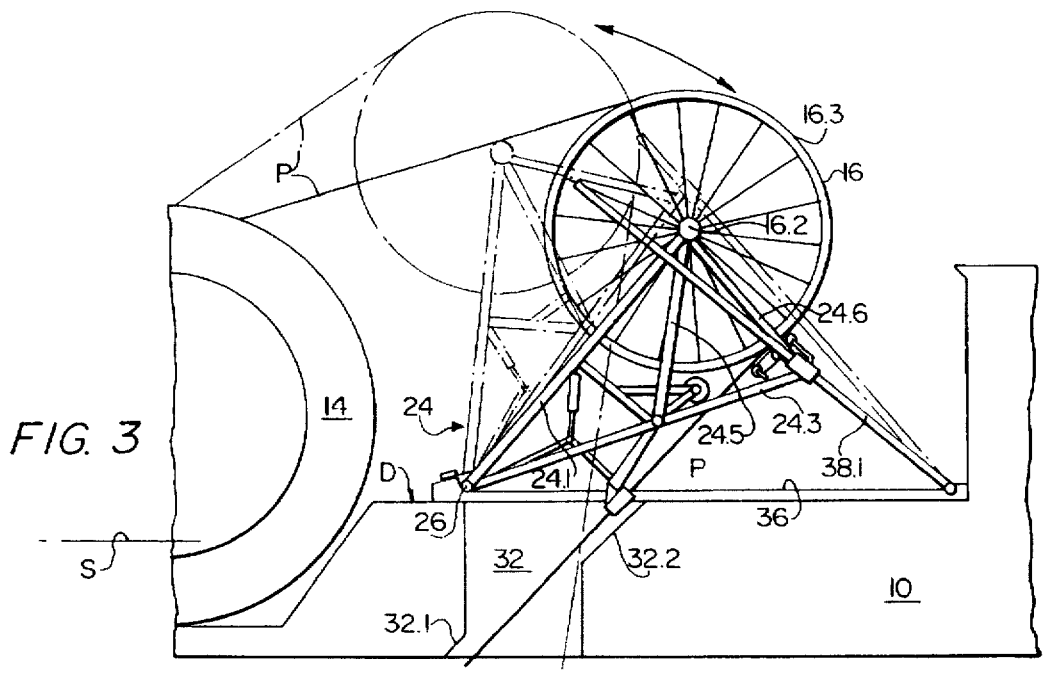
FIG. 3 is a magnified fragmentary view of FIG. 2 illustrating the multiple positions of the aligner wheel and the guide means for controlling these positions.
Figure 11:
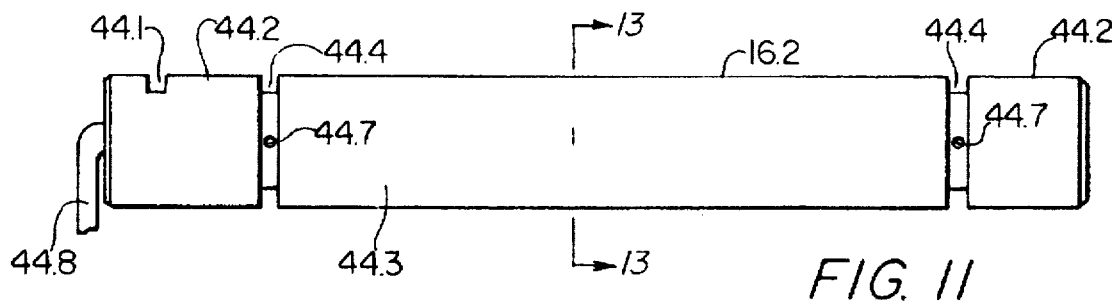
FIG. 11 is a side view of the axle of the aligner wheel.
Figure 12:
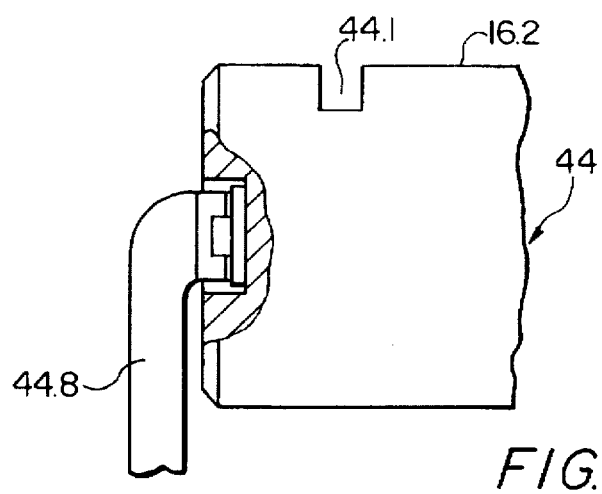
FIG. 12 is an enlarged fragmentary view of the axle of FIG. 11 illustrating the strain gauge connection.
Figure 13:
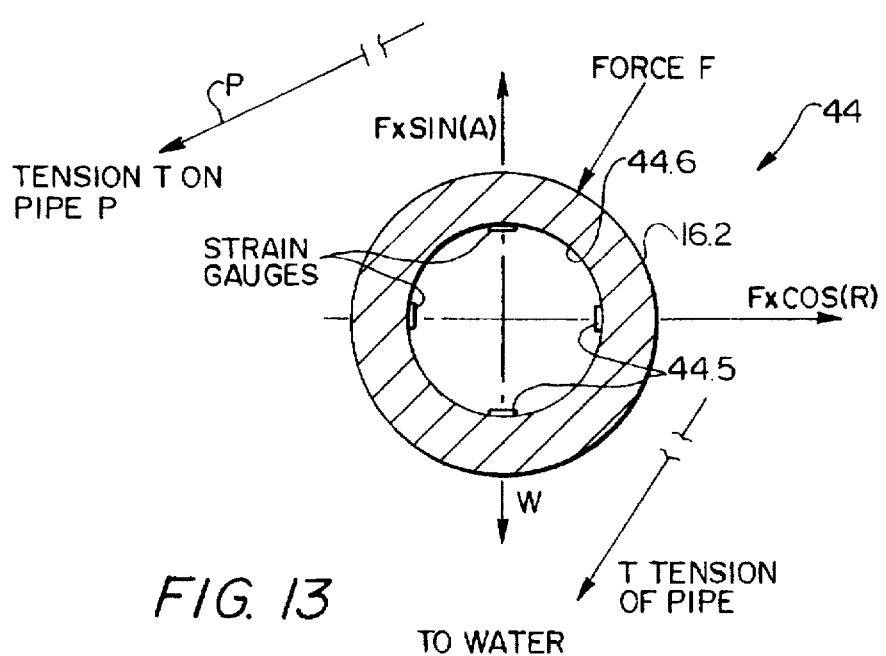
FIG. 13 is a cross-sectional view taken along lines 13—13 of FIG. 11 and illustrating the force vectors in conjunction with the strain gauge.

The present invention includes a number of features that will be described in detail. These features include: A) pipelaying vessel with vertical pipe storage reel depicted in FIGS. 2 and 3 and 8 through 10; B) vertical aligner wheel illustrated in FIGS. 2 through 7; C) the moon pool, as best shown in FIGS. 2 and 3; D) the support means for the vertical aligner wheel shown in FIGS. 2, 3, 4, 5, 5A; E) the direction means which together with the support means forms the guide means and includes the jactuator, struts and the pivoted arrangement at the flat bed is shown in FIGS. 2, 3, 4, 5 and 5A; F) the transverse shifting assembly is illustrated in FIGS. 4, 5, 5A and 8 through 10; G) the pipe tension measurements using strain gauges on the axle of the aligner wheel is depicted in FIGS. 11 through 13; H) the pipe straightener including the continuous track and accompanying rollers as well as the sprockets and beams to apply a first holding force at the pipeline and aligner wheel contact and the second bending force only after the pipeline takeoff from the aligner wheel is shown in FIGS. 14 through 21; and finally I) the pipe clamp is illustrated in FIGS. 3, 4 and 23 through 26.

Specific Description of the Preferred Embodiment

A) The Vertical Pipe Storage Reel and Pipelaying Vessel

The pipelaying vessel of the present invention is shown generally at 10 as having a conventional wheel house section 12 and is provided with a vertical reel 14 unto which the pipeline P is spooled in an offshore operation and an aligner wheel 16 to receive the takeoff of the pipeline from the reel 14. The vertical reel 14 is positioned within a cutout 18 in the structure of the pipelaying vessel 10 as best shown in FIG. 2. The vertical reel 14 is rotatable within the cutout 18 about an axis 20.

A capability of the pipelaying vessel of the present invention is to spool the vertical reel while the reel 14 is positioned as shown. Also for spooling at a spooling yard and for very shallow water depth pipe lays, it is possible to spool or unspool the pipeline P forwardly from, or to, the storage reel 14 and onto the aligner wheel 16. In such case, the pipeline P as shown in FIG. 2, would extend across the bow 11 into the water for laying on the sea bed as will be later described.

Figure 8:
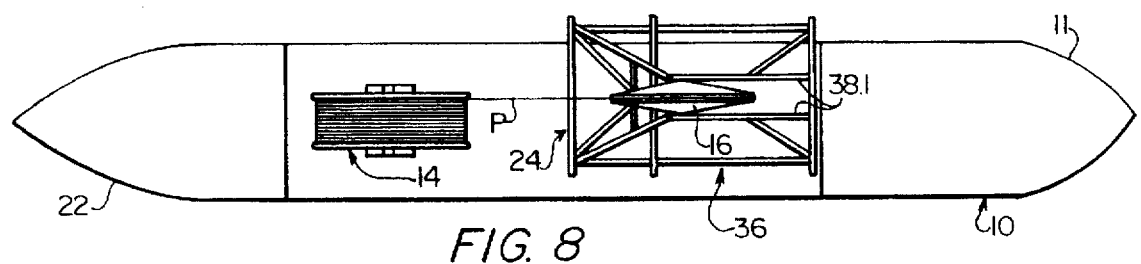
FIG. 8 is a plan view of the pipelaying vessel illustrating the positioning of the guide means and vertical aligner wheel shifted through to the extreme port side of the vessel to receive the pipeline being unspooled from the extreme port side of the vertical reel.
Figure 9:
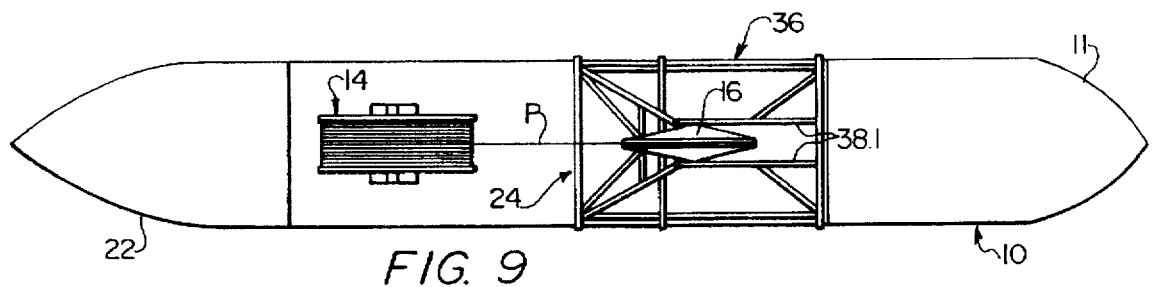
FIG. 9 is a plan view similar to that of FIG. 8 but illustrating the guide means and aligner wheel essentially midship to receive the pipeline from approximately the center of the vertical reel.
Figure 10:
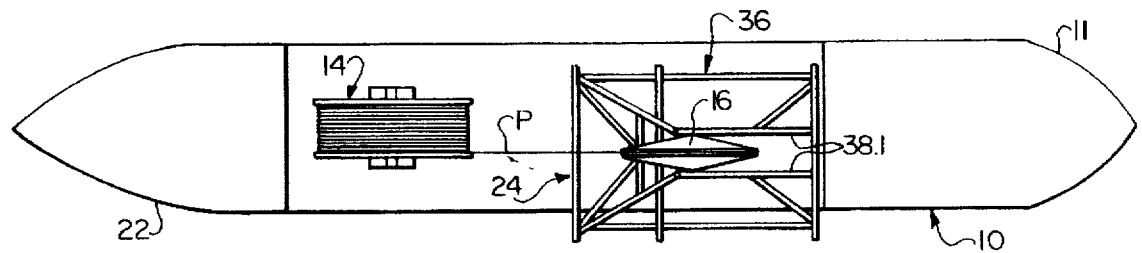
FIG. 10 is a view similar to that of FIGS. 8 and 9 but illustrating the guide means and aligner wheel on the extreme starboard side to receive the pipeline unspooling from the extreme starboard side of the vertical reel.

As clearly is shown in FIG. 2 as well as in FIGS. 8 through 10, the vertical reel 14 is substantially aft of amidships and is closer to the stern 14 of the vessel than to the bow of the vessel. This is a departure from the prior art location of the vertical reel, which was substantially amidship in order to accommodate the ramp positioned on the stern of the vessel.

The vertical reel 14 of the present invention has substantial capacity and may contain up to 2500 metric tons of pipe having a diameter that may be several inches to almost two feet.

B) Vertical Aligner Wheel

A principal feature of the present invention is the novel wheel aligner 16 that uniquely supports the pipeline along the circumference of the wheel aligner for a greater length than in the past to achieve increased safety and security. The wheel aligner is vertically positioned and supported by a frame 24 that is pivoted at its lower end 26 to enable the wheel aligner 16 to swing within an approximately about 42° to 88° arc as shown in FIG. 3 by the phantom lines illustrating a substantially upright position. At the upper end 28 the aligner wheel is journaled as shown at 30 in FIG. 6 for rotation about axle 16.1.

The vertical aligner wheel 16 is a spoked wheel having spokes 16.1 preferably made up of standard wide flange or "T" steel shapes so that their flanges are welded to circular plates 16.5 surrounding axle 16.2. The flange of the spokes 16.1 are connected to the webs 16.6 secured between the plates 16.5.

The spokes 16.1 converge from the wide base at the axle 16.2 up to a narrow center rim 16.3 that is the circumference of the aligner wheel 16. At the base of the spokes the circular plate 16.5 and their webs 16.6 are secured to a jacket pipe 16.7 surrounding axle 16.2. The plates 16.5 comprises on each side of the axle a pair of circular plates having a central opening for the axle 16.2. These plates are perpendicular to and rigidly welded to the jacket pipe 16.7. Connecting these circular plates 16.5 with the web plates 16.6 therebetween assures the structural integrity of the assembly.

These web plates 16.6 are radially located to support each spoke 16.1 of the aligner wheel 16. The axle 16.2 may be secured within the jacket pipe 14.4 for common rotation within the journals 30 that are provided with suitable lubricated bearings.

The spokes may be so numerous as to form in effect a continuous wall that may show no individual spokes.

Rim 16.3 is preferably made of a curved "T" structural shaped material, as best shown in FIG. 7, and has an external radius equal or slightly larger than the drum radius of the vertical reel 14. Both the inside faces of rim 16.3 are augmented by stiffener plates 16.8 to provide a sound structural connection for spokes 16.1 projecting from both sides of the central hub or axle 16.2 of the aligner wheel 16. The center web 16.3.1 of the rim 16.3 may be several feet wide, preferably about 36 inches wide to support the removable pipe support casings 16.9 preferably made of a hard plastic material and suitably secured within the rim 16.3. This plastic material could be nylon or polypropylene or the like. These castings shaped with the curvature of the rim contain pipe accommodating grooves 16.10 in order to positively maintain the pipeline in place on the rim. The size of the grooves depend upon the size of the pipeline although a single standard V groove block casting satisfies requirements for at least 90% of the typical pipeline laying procedures.

The wheel aligner 16 is not independently driven as shown but it is possible by installing a rim gear (not shown) on one side of rim 16.3 and hydraulic or electric motor mounted on the frame 24 for the aligner wheel 16 to be powered, if so desired.

C) Moon Pool

The moon pool 32 is positioned substantially midships and notably forward of the vertical reel upon which the pipeline is spooled. The moon pool is shaped having a back angled bulkhead portion 32.1 located essentially at the keel of the vessel and on the other side of the moon pool a forwardly angled bulkhead 32.2 to accommodate the path of the pipeline as it unspools from the vertical reel onto the aligner wheel, into the moon pool 32 and down into the sea S. The two sloping angled bulkheads 32.1 and 32.2 cooperate with each other as best shown in FIG. 3 to allow the pipeline to be buried at the shallowest angle wherein the pipeline would make an angle about as low as about 42°. The moon pool 32 constitutes an opening from the deck D of the pipelaying vessel 10 down to the sea S and its position forward of the supply reel 14 allows better handling of the pipeline P and permits, along with the aligner wheel pivoting movement a wide variety of angular incidents between the pipeline P and the sea S.

D) Pivoted Support for Rotating Aligner Wheel

Figure 5A:
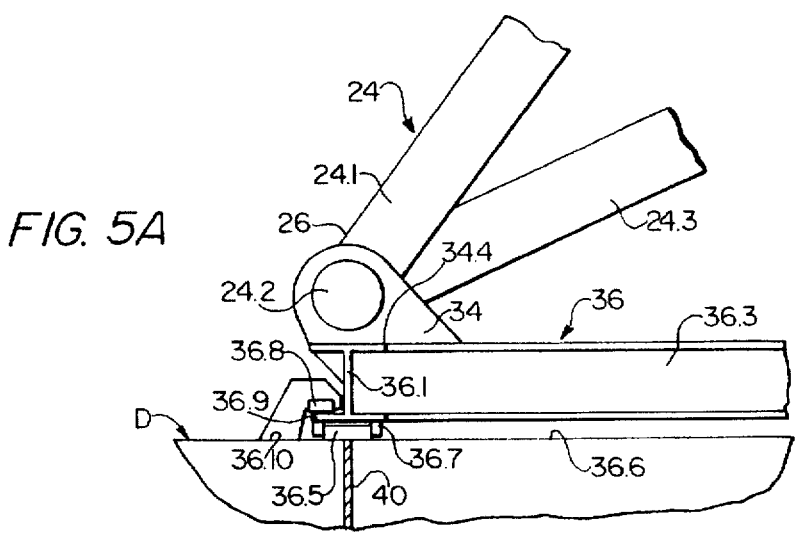
FIG. 5A is an enlarged fragmentary view partly in section of the transverse shifting assembly illustrating the base secured to the vessel, a bed superposed on the base and the hook to retain the bed onto the base.

The frame 24 is composed of a back frame 24.1, which transfers axial loads from the aligner wheel 16 to horizontal hinge bar 24.2 that pivots freely within spaced bearing housings or ears 34 secured to flat bed 36 as shown in FIGS. 5 and 5A. A front frame 24.3 is also secured to the hinge bar 24.2 and is fixed relative to the back frame 24.1 making an angle of approximately 30° between the back frame 24.1 and the front frame 24.3. This angle is not critical and may vary. Suitable cross bracings 24.4 extend between the members forming the back frame 24.1 and the members forming the front frame 24.3. Back axle bracings 24.5 and front axle bracings 24.6 extend on each side of the aligner wheel up to and becomes integral with a journal 30 on each side of the aligner wheel 16.

The support provided by the frame 24 for the aligner wheel 16 is capable not only of permitting free rotation of the aligner wheel within journals 30.30 but also of pivoting the aligner wheel from the relatively low angle of 42° as shown in FIG. 3 to the high takeoff angle 88° this is approaching the 90° mark permitting laying in ultra deep water depths reaching 7,000 feet or more. This generally lower limit of 42° is used in relatively shallow depths (150 to 400 feet).

In shallower waters, as well as shore approaches, the vessel lays pipelines using a different configuration, as shown in FIG. 2, to support the pipeline, illustrated in phantom lines, off the bow of the vessel using roller assemblies 38.1, 38.2 and 38.3 respectively extending forwardly from the aligner wheel 16. Each of these roller assemblies is adjustable in height. The pipeline in this case is not directed downwardly into the moon pool 32 but taken off the supply reel 14, over the aligner wheel 16 and along roller assemblies 38.1, 38.2 and 38.3 to extend beyond the bow 11 of the pipelaying vessel 10.

E) Direction Control of the Pivoting of the Aligner Wheel

The frame 24 and therefore the aligner wheel 16 are both pivoted about the hinge bar 24.2 by an essentially two dimensional strut 38 often referred to as a jactuator as shown in FIGS. 3, 4 and 5. The jactuator strut 38 comprises a pair of elongated tubular members 38.1 that extend angularly upwardly from hinge bar 38.2, substantially identical to the hinge bar 24.2, to which they are secured. A plurality of bracings 38.3 may extend also from the hinge bar 38.2 up to an intermediate point 38.4 to provide rigidity to the tubular struts 38.1. Cross bar 38.5 is further provided to add to the stability of the jactuator 38.

The hinge bar 38.2 is similarly received for pivotal movement within bearing housings or ears 38.6 and secured to flat bed 36 in the same manner that frame 24 is pivotally secured to the bed 36. The hinge bar, similar to the other elongated structural elements utilizing in this invention, is a tubular member. It acts similar to a hinge pin and receives the tensile and compressive forces from the tubular struts 38.1. The hinge 38.7 within the bearing housings 38.6 is preferably a lubricated brass bushing within a housing to securely support the tubular struts 38.1 onto the flat bed 36.

The jactuator 38 is secured to one end of the front frame 24.3 by a housing 38.8 that is pivotally connected at 38.9 to the upper end of the front frame 24.3 as readily seen in FIG. 5. The housing 38.8 is constructed to substantially encompass the tubular strut 38.1 wherein on one side of each of the tubular struts 38.1 linear racks 38.10 are positioned to mesh with suitable crawling gears or pinions such as the tooth gears 38.11 positioned within the housing 38.8. The crawling gears 38.11 are actuated by hydraulic or electric motors (not shown) within the housing 38.8 on each of the tubular struts 38.1.

Thus it can be seen that as the crawling gears 38.11 are activated, the housing 38.8 rides up or down the pivoted tubular struts 38.1 thereby necessarily raising or lowering the frame 24 and, of course, the aligner wheel 16. As it is quite apparent, the position of the housing 38.8 along the jactuator tubular struts 38.1 determines the angle of the frame 24 and therefore the positioning of the aligner wheel over the moon pool 32 to within the arc that generally extends preferably between about 42° to about 88°. Such angular positioning of the aligner wheel allows for the pipelaying vessel to lay pipe in shallow water or in very deep water.

It should be manifest from the foregoing that the vertical aligner is positioned forwardly of the supply reel 14 for receiving the pipe from the reel and rotating about a horizontal axis formed by axle 16.2. The vertical aligner 16 is supported by the frame 24 and its direction and angular position are controlled by the direction means in the form of the jactuator strut 38.

The direction means and the support means create a guide means for supporting and directing the aligner wheel 16 for rotational movement about a horizontal axis in the form of axle 16.2 and pivotal movement about a horizontal axis formed by the hinge bar 24.2.

F) Transverse Shifting Assembly—Shifts Guide Means

The aligner wheel 16 must be adjusted horizontally or athwartship depending upon a position of the pipeline takeoff from the vertical storage reel 14 to assure colinearity between the pipeline takeoff and the point of contact of the pipeline with the aligner wheel 16. As the pipeline is unspooled, the horizontal takeoff angle to the aligner wheel would vary if the aligner wheel were to remain stationary relative to the vessel and the storage reel 14. This variation angle would mean that the pipeline would not be properly positioned on the aligner wheel. Accordingly, the aligner wheel has been constructed to adjust athwartship to maintain the horizontal takeoff angle of the pipeline nearly perpendicular to the axis of the storage reel 14.

In accordance with the present invention, not only the aligner wheel 16 but also the support means is the form of frame 24 and the direction means in the form of jactuator 38 is to be shifted sideways in accordance with the takeoff position of the pipeline from the storage reel. To accomplish this goal, the support means in the form of frame 24 and the direction means in the form of jactuator 38 that both form the guide means are supported on a flat bed 36. It is the flat bed upon which both the frame 24 and the jactuator struts 38 are hinged to permit the aligner wheel to swing through the arc within the 42° to 88° range and it is this flat bed that provides not only the support for these structures but also permits the movement athwartship to accommodate for the control of the horizontal takeoff angle of the pipeline from the vertical supply reel.

Flat bed 36 consists of a grid structure of structural members forming the solid and rigid flat bed sufficiently sturdy to receive both the frame 24 and the jactuator struts 38. The flat bed 36 is composed primarily of main or athwartship girders 36.1 on either end of the flat bed and an intermediate or middle girder 36.2. Each of these girders is preferably a steel I-beam to which are welded a plurality of longitudinal and parallel I-beam girders 36.3 as shown to be four in number, though that number is not at all critical.

The longitudinal girders 36.3 absorb horizontal tensile loads. Vertical loads are transferred to the top surface of the vertical bulkheads 40 and 42 being respectively the aft and forward vertical bulkheads as shown in FIG. 5.

As best shown in FIG. 5A, longitudinal girder 36.3 constituting the girder on the starboard side of the vessel extends to contact the main girder 36.1 at welded junction 36.4. Beneath the flange of the I-beam forming main girder 36.1 are lateral rollers 36.5 positioned along the length of the main girder 36.1 for contact with the hard surface base 36.6 which is the deck D. The linear rollers 36.5 may be secured to the underside of the main girders 36.1 in any suitable fashion by trunnions 36.7 secured below the flange of the main girder 36.1 and journaled to receive the linear rollers 36.5.

A plurality of hook rollers 36.8 are provided to contact the outermost flange of 36.9 of the main girders 36.1 to retain the flat bed 36 in position. The rollers 36.8 are suitably secured to the base 36.6 by arm 36.10. Accordingly, it should be apparent that the hook rollers 36.8 and the linear rollers 36.5 provide antifriction means to permit the flat bed 36 to move side to side athwartship in order to meet the requirements of the takeoff position from the storage reel 14.

The flat bed 36 may be as wide as the vessel's width therefore overhanging many feet up to 12 or more when displaced on either the port or starboard side of the vessel in order to maintain the alignment of the wheel aligner to the pipeline unspooling from the vertical reel 14. The portmost, central and starboardmost positions are shown in FIGS. 8 through 10 respectively.

As shown in FIGS. 4, 5 and 5A, a rack may be positioned as shown at 36.11 on the base 36.6 and suitable pinions 36.12 positioned on the main girder 36.1 along with suitable hydraulic or electric motors will move the flat bed athwartship as required.

The top surface of the flat bed 36 may be covered by a grating (not shown) to provide a work platform for construction personnel. Similarly, the area around the moon pool 32 may have an adjustable opening (not shown) or removable platform (also not shown) to provide a safety environment and yet to provide for passage of the pipeline.

G) Measurement of Pipeline Tension

An important feature of the wheel aligner is that there is a system that measures directly the tension on the pipeline P as it enters the moon pool 32 and therefore constitutes the tension on the pipeline as it descends to the sea bottom. In the past the tension of pipelines has been measured but there was no way effectively to measure the tension of the pipeline just prior to the entrance into the water and thus any measurement earlier in the traverse of the pipeline would negate the accuracy of the measurement. Prior art measurements of pipeline tension were made by having the pipe pass over rollers that had an inherent internal friction that would change the effective tension of the pipe from the reading on the tension measurer. Unfortunately in many instances, the inaccuracy of such measurement amounted to many thousands of pounds.

In some special cases where the deflection of the pipe being laid is to be within limits, the tension should be known accurately so that the geometry of the pipe would be accurately determined. In the past that was not possible.

However, in accordance with the present invention such accurate measurement of pipeline tension is for the first time obtainable. This is accomplished by the use of conventional strain gauge technology but in combination with the novel wheel aligner 16 and particularly the axle 16.2 of the wheel aligner. Without the wheel aligner and its axle and without the use of the strain gauge technology, the pipeline tension measurement could not be made. No known combination of strain gauge technology applied to the axle of wheel guiding the pipeline's descent into the water has ever been shown to exist.

The measurement of the tension of the pipeline P by means of the wheel aligner 16 and its axle 16.2 is shown in FIGS. 11 through 13. FIG. 11 is an enlarged depiction of the wheel aligner axle 16.2 and discloses a keeper plate slot 44.1 to receive a keeper (not shown) when the hub of the aligner wheel is installed on the axle 16.2. The areas 44.2 positioned on the axle. 16.2 are for bearing support for the axle. This bearing support is as shown in FIG. 11 to be at both ends of the axle and permits the wheel aligner to revolve within the journals 30. The center body support 44.3 receives the full force of weight of the aligner wheel and the force derived from the tension T applied to the pipeline.

The axle 16.2 also includes strain gauge zones 44.4 on both ends of the axle inwardly from the bearing zones 44.2. As best shown in FIG. 13 conventional strain gauges and their connections are distributed 90° apart within the inner surface 44.6 of the tubular axle 16.2. The strain gauges are sealed inside small axial holes 44.7 distributed around the circumference of the strain gauge zones. As there are 8 strain gauges, 4 within each strain gauge zone 44.4, there would be 4 axial holes 44.7 within each strain gauge zone 44.4 and are located at two different depths corresponding to strain gauge zones 44.4. In order to sense only those strains that are induced by the sheer forced at these two sections the gauges are position oriented at a neutral plane relative to one specific direction of strain gauge loading.

The strain gauges are connected to a conventional cable 44.8 and then to a conventional analyzer (not shown) to compute directly the force applied to the pipeline.

In reference to FIG. 13 it should be understood that the strain gauges will measure the force F applied to the axle 16.2 and this force F and the weight W of the wheel aligner 16 is equal to 2T, cosine of X where T is the tension of the pipeline and X is the angle between the direction of the pipe being wound around the wheel aligner 16 and the direction of the pipeline unwound from the wheel aligner 16 as shown in FIG. 13. Each of those forces when broken into their components include T cosine X as the force component in the direction shown that would be measured directly by the strain gauge.

The strain gauges 44.4 used in this invention are conventional and are in themselves not an aspect of this invention unless combined with the aligner wheel axle.

The present invention is unique in that no known pipelaying vessel exists that can directly measure tensile forces on the pipeline without estimating uncertain frictional forces of the various equipment and apparatus involved. In effect, although tensioner machines are calibrated to estimate the force imposed on the pipeline in prior applications, other forces, usually originating from surrounding equipment supporting the pipeline, are always ignored. Therefore the result is an inaccurate prediction of the correct tensile forces on the pipeline that can lead to overstressing or to an inaccurate geometrical prediction regarding the laying of the pipeline. Those problems do not exist with the apparatus and method of the present invention.

H) Pipeline Straightener and Handler Assembly

A straightener and handling system 46 provides a means for straightening an otherwise permanently deformed pipeline as shown in FIGS. 14 through 21. The principal means for handling the pipeline during regular pipelay work is the continuous track 46.1 that is essentially a tractor type or a crawler track having a plurality of plastic shoes made of nylon, polypropylene or other hard plastic material. As shown at 46.2 these shoes may be V-shaped in cross-section as depicted in FIGS. 18 through 21 in order to contact the pipeline P and hold the pipeline against the circumference of the aligner wheel 16.

Figure 14:
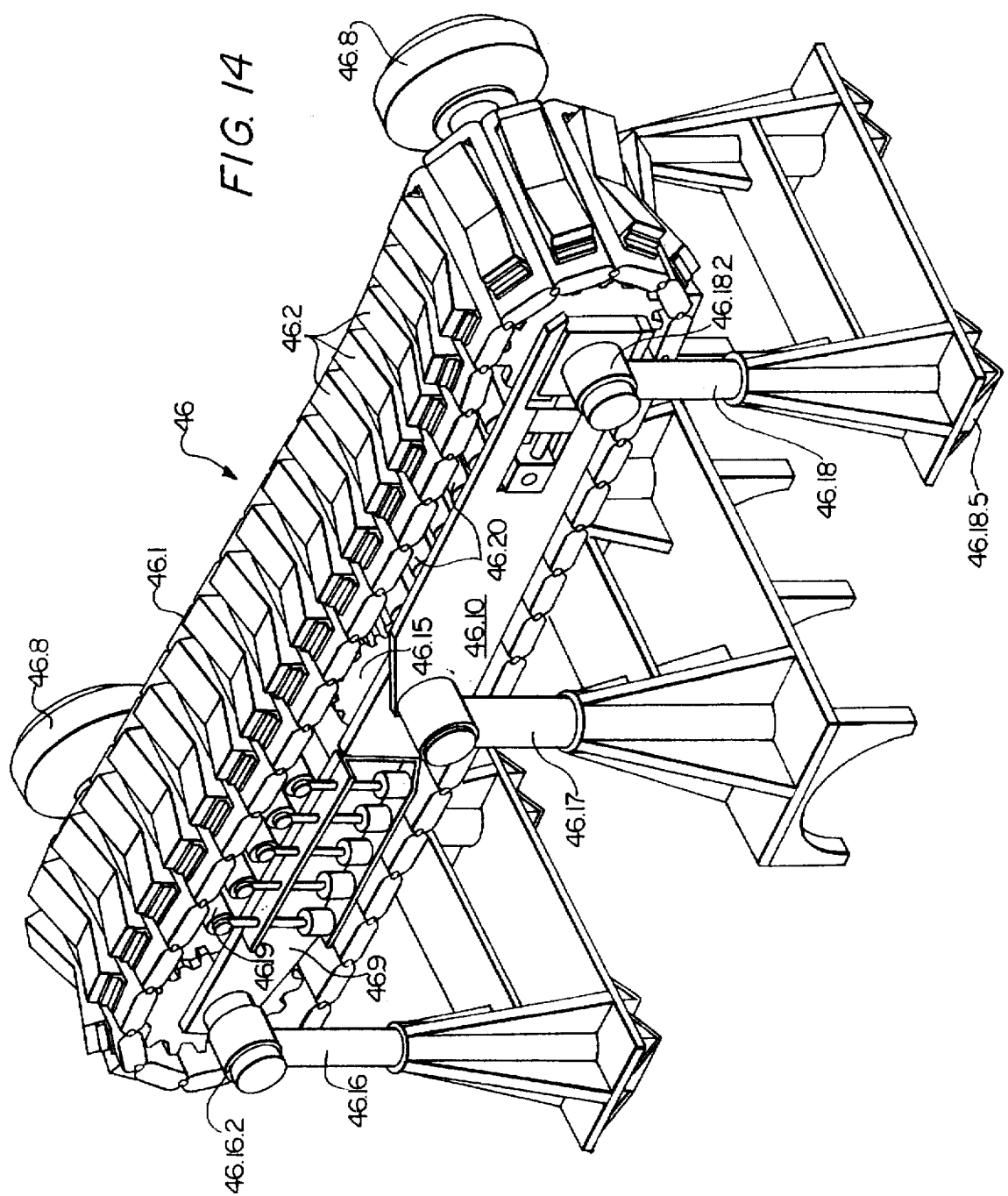
FIG. 14 is a perspective view of the endless crawler track for contacting the pipeline and illustrates not only the sprockets and beams but also the rollers and the extensible means for raising and lowering the rollers.
Figure 15:
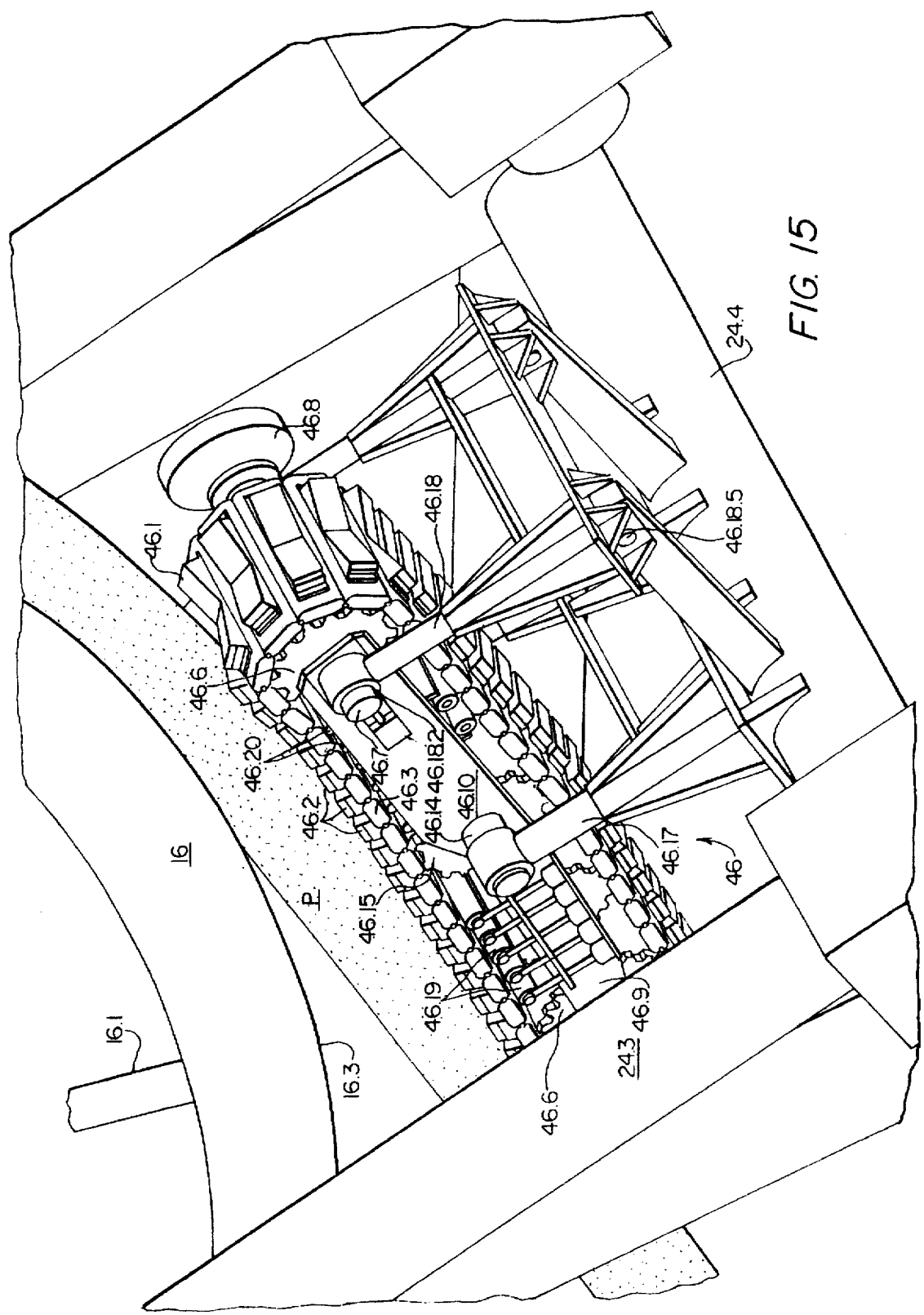
FIG. 15 is a perspective view, partly broken away, similar to that of FIG. 14 but illustrating the positioning of the pipe straightener and endless track with respect to the pipeline and aligner wheel.
Figure 16:
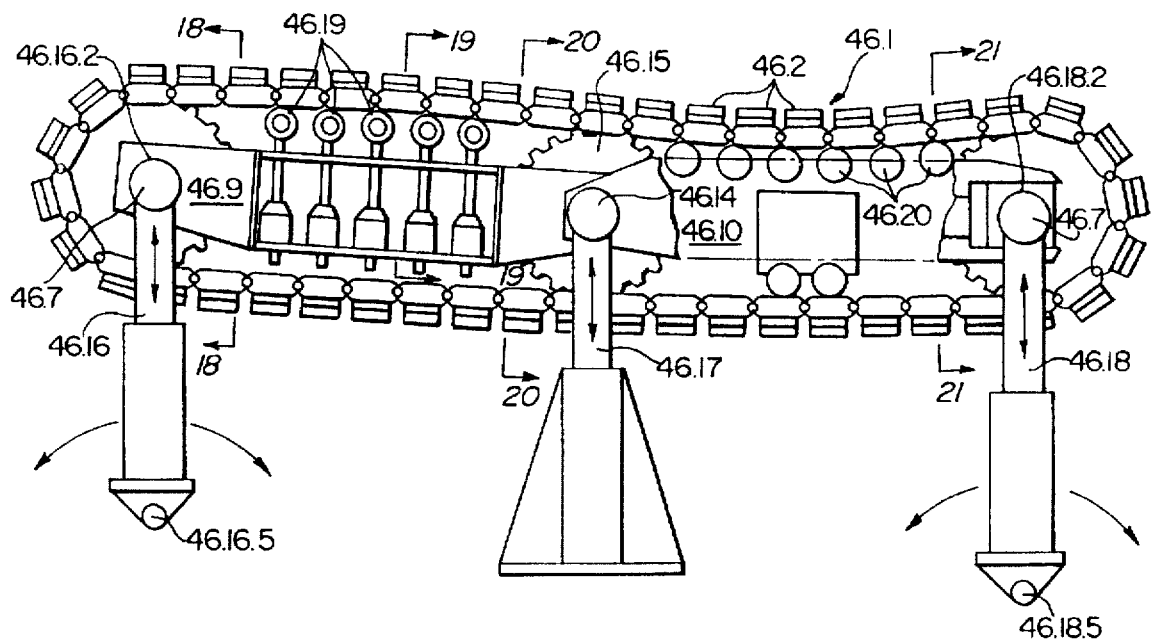
FIG. 16 is a side elevational view of the pipe straightener illustrated in FIGS. 14 and 15 and particularly illustrating the rollers and extensible means.
Figure 17:
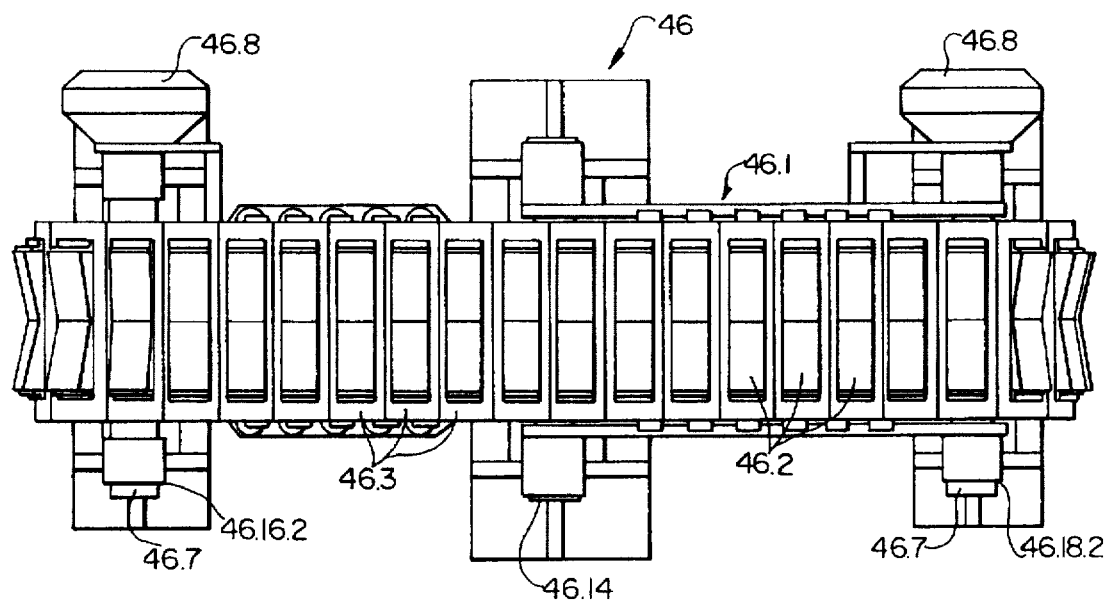
FIG. 17 is a plan view of the pipe straightener of FIGS. 14, 15 and 16.
Figure 18:
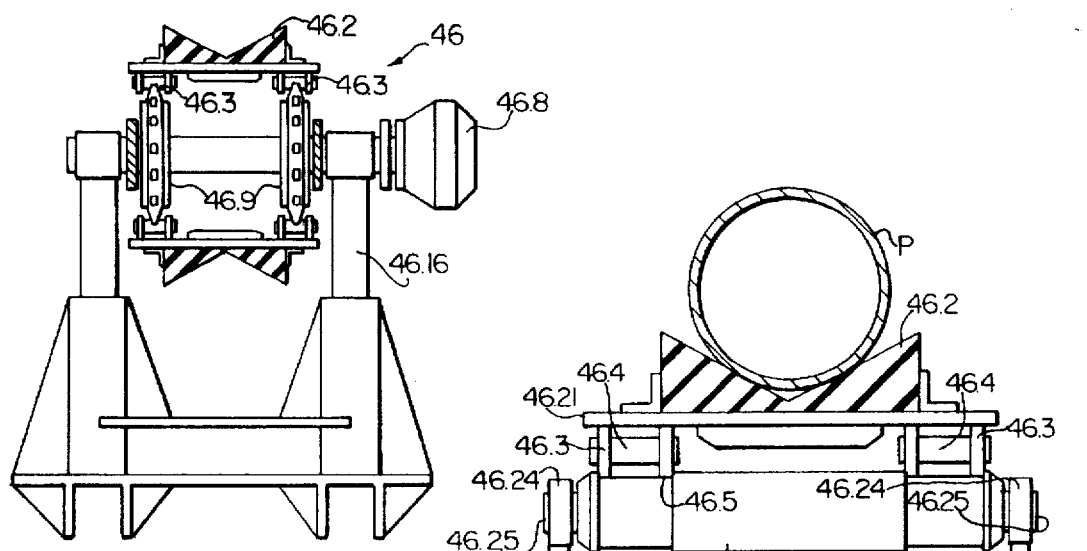
FIG. 18 is a cross-sectional view taken along lines 18—18 of FIG. 16 and illustrates the operation of the sprockets and the pipeline support means.

As shown in each of the FIGS. 14 through 21, the endless track 46.1 serves two purposes, a) the right hand portion of the track as viewed from the figures contacts the pipe and maintains it into contact with the aligner wheel while b) the left hand portion of the track is a pipe straightener system that is in contact with the pipe after the pipe has left the contact with the aligner wheel as best shown in FIG. 15. At all times the track 46.1 applies two separate uniform independent forces on the same side of the pipeline away from the wheel aligner circumference.

The endless track 46.1 of the present invention serves therefore the dual purpose of holding the pipeline against the circumference of the aligner wheel and also after takeoff of the pipeline from the aligner wheel contact is made by the endless track to straighten the pipeline. It should be manifest that these two forces applied as above described each serve a different purpose and effectively aid in delivering the straightened pipeline to the moon pool 32.

The plastic shoes 46.2 are held against the pipeline P by being secured to a plurality of plates 46.2.1. Each plate is provided with a corresponding link 46.3 secured thereon. The links 46.3 are held together by pairs of opposed pins 46.4 suitably held in openings 46.5 in the links. The lateral pins 46.4 are also designed to mesh with corresponding sprocket wheels 46.6 that are fixed to a pair of rotatable axles 46.7 disposed at either end of the endless track and are powered by hydraulic or electric motors 46.8.

The axles 46.7 are driven by their respective motors and are supported by beams 46.9 and 46.10. These beams being respectively the straightening beam and the handling beam primarily because the purpose they serve is to either support the straightening function or the pipe handling function as previously described.

Figure 19:
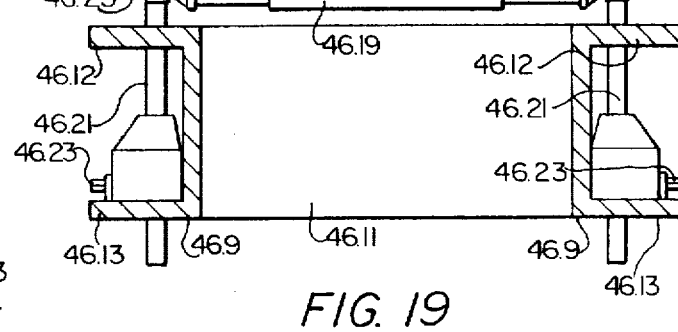
FIG. 19 is a cross-sectional view taken along lines 19—19 of FIG. 16 and illustrating the relationship between the rollers and the track links and the extensible means for the rollers.
Figure 20:
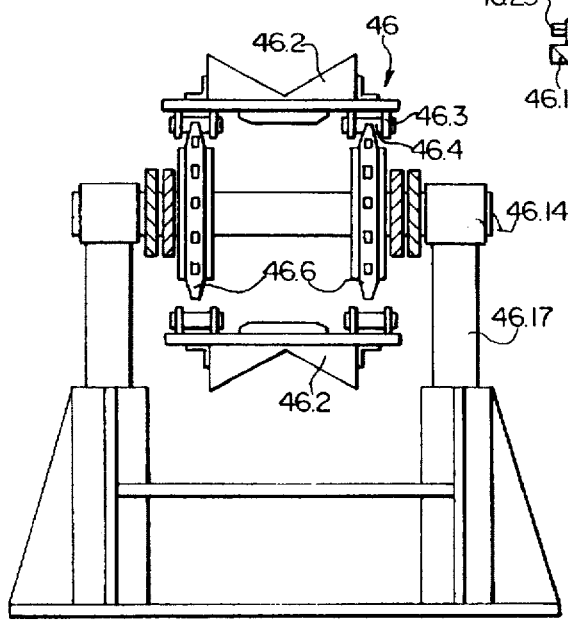
FIG. 20 is a cross-sectional view taken along lines 20—20 of FIG. 16.
Figure 21:
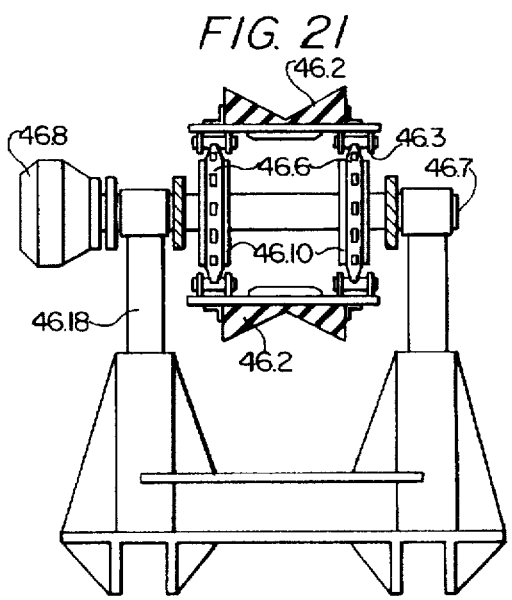
FIG. 21 is a cross-sectional view taken along lines 21—21 of FIG. 16.
Figure 22:
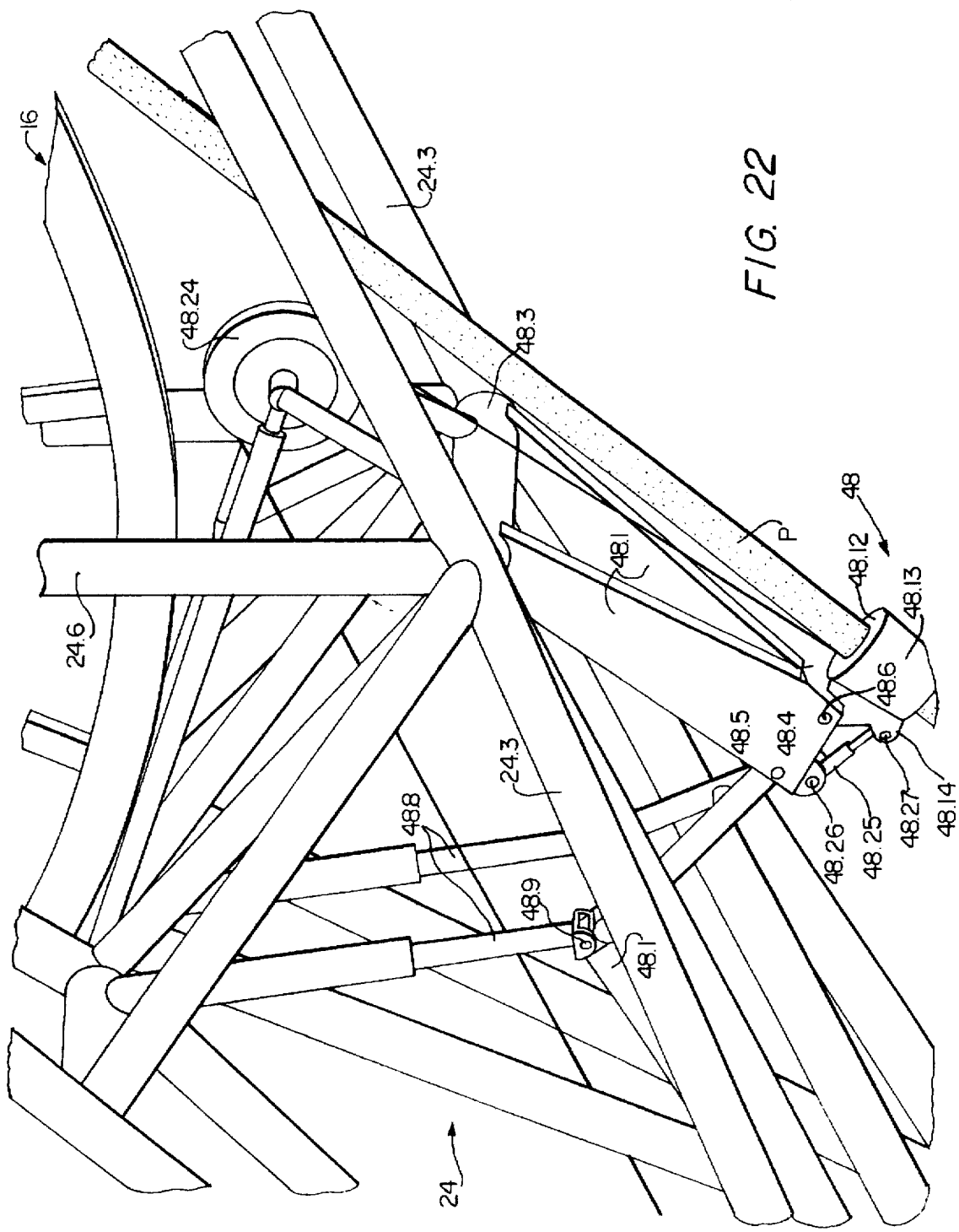
FIG. 22 is a perspective view of a fragment of the guide means and aligner wheel illustrating primarily the A&R pipe clamp extending from the support means and connected to at least one arm member for engagement with the pipe and clamping the pipe to support the weight of the pipe.

The beams 46.9 and 46.10 are in pairs as best shown in FIG. 19 that are secured together by vertical plates 46.11. Each of the beams has outwardly protruding flanges, an upper flange 46.12 and a lower flange 46.13. The straightening beam 46.9 and the handling beam 46.10 are secured at the middle of the endless track by idler axle 46.14 which supports idler sprocket 46.15 that meshes with the links 46.3 and maintains the links at an appropriate spacing between the upper row of links and the lower row. Hydraulic or mechanical jactuator assemblies are designed to raise and lower the sprockets 46.6 and 46.15 to maintain a linear position adjustment capability. Each of these jactuators may be a conventional hydraulic ram or the like to permit the linear position adjustment of the sprockets and therefore the positioning of the links 46.3 and the shoes 46.2 against the pipeline P.

As best shown in FIGS. 14, 15 and 19, a plurality of rollers is provided with 46.19 representing the straightener rollers and 46.20 the pipe handling rollers. These rollers are formed from steel and are held in place by a pair of threaded columns 46.21 threaded through the upper and lower flanges 46.12 and 46.13 as best shown in FIG. 19. An actuator 46.22 having a suitable internal nut (not shown) rotatable by wrench drive 46.23 which when rotated raises or lowers the threaded column 46.21 to raise or lower the steel rollers 46.19. At the end of the threaded columns 46.21 are journals 46.24 that are provided with suitable lubricated bushings and receive therein stub axles 46.25 on either end of the rollers to permit the rollers to rotate freely within the journal.

The pipe handling rollers 46.20 are mounted on top of the handling beam 46.10 and follow the radial configuration imposed on the pipeline by the wheel aligner 16. No adjustment to the relative radial position of these rollers is required. Straightener rollers 46.19 however require a position adjustment for different curvatures required for each pipeline size.

As the rollers 46.19 and 46.20 are raised or lowered, they are always in contact with the links 46.3 by reason of the contact between the base 46.5 of the links and the surface of the roller as clearly shown in FIG. 19.

The pipe handler portion of the straightener handler system 46 essentially is composed of driven sprocket 46.6, idler sprocket 46.15, pipe handler rollers 46.20, pipe handling beam 46.10 and jactuators 46.17 and 46.18. These jactuators 46.17 and 46.18 are positioned so that idler pipe handling rollers 46.20 press against the track 46.1 by means of beam 46.10. The resulting compressing force provokes a reactive force from the wheel aligner 16 confining the pipeline in between the pipe handling track and the wheel aligner and developing a frictional force between the pipeline, wheel aligner 16 and pipe handler track 46.1 only within the areas of contact between the pipeline P and the circumference of the wheel aligner 16. This frictional force results in movement of the pipeline back and forth by action of driven sprocket 46.20 working in tandem with driven sprocket 46.9 all such movement being synchronized with the movement of the vertical supply reel 14.

The pipe straightening portion of the continuous track includes the idler sprocket 46.15, driven sprocket 46.16, straightening beam 46.9, neutral or idler jactuator 46.17 and active jactuator 46.16 along with the straightener rollers 46.19. In order to permit the jactuators to make the movements desired, the base of the jactuators are pivoted at 46.16.5 for the jactuator 46.16 and 46.18.5 for the jactuator 46.18 controlling the pipe handling.

The action of the pipe straightener portion of the continuous track 46.1 pressurizes the pipeline after the pipeline P has taken off and is not in contact with the aligner wheel 16 to permit the application of a reverse curvature effectively straightening the permanent deformation of the pipeline imposed by the spooling about the tight radius of the vertical supply reel 14. The jactuators 46.16 and 46.18 are pivotable at both ends, that is, at 46.16.2 and 46.18.2 respectively where they are journaled to the driven axles 46.7 at the upper end and are pivotable about their respective lower connections at 46.16.5 and 46.18.5 respectively where they are connected to the bracing 24.4 of the front frame 24.3.

I) The A&R Clamp

The abandonment and recovery clamp (A&R clamp) is best shown in FIGS. 22 through 26. The A&R clamp permits a secure anchoring of the end of the pipeline to the vessel. Such secure anchoring is required for any planned or emergency abandonment and recovery and for pipelay termination. Clamping of the pipeline is also necessary in order to repair a damaged section of the pipeline.

Prior to abandonment, pipelaying stops and the A&R clamp 48 moves towards the pipeline by means of clamp support arms 48.1 which are a pair of flat angular plates having an upper end 48.2 secured to a rotatable hinge bar 48.3. The hinge bar 48.3 is permitted limited pivotal movement between front frame tubular members 24.3. At the opposite end of the support arm 48.1, the support arm is widened as shown at 48.4 to be articulated at each corner 48.5 and 48.6. Secured at pivot points 48.5 are a pair of opposed articulated arms 48.7 that are secured to the support arm 48.1 and permitted the freedom of movement allowed by pivot point 48.5. The ends of articulated arms 48.7 are controlled by rams 48.8 that meet at articulated pivot point 48.9. The opposite end of rams 48.8 are secured to frame 24 as shown at 48.10. At the particulated pivot point 48.9 another articulated arm 48.11 is also braced against undesirable movement by being secured to hinge bar 24.2. Accordingly, actuation by the rams 48.8 acting in unison draw the support arms 48.1 towards or away from the center of frame 24.

Secured pivotally to the pivot point 48.6 is the aligner clamp 48.12. The clamp is composed of a body 48.13 formed from a pair of hinged half shells 48.14 which together rotate about vertical hinge 48.15 to allow the half shells to open and close around the pipeline P. An engagement latch 48.16 actuated by lever 48.17 is provided with a hook to engage a protruding pin 48.19 in the hinged half shell 48.14.1 which pin, is accommodated in suitable notch 48.20 positioned in the stationary half shell 14.2.

The half shells are conical in their longitudinal cross section as shown in FIG. 23 and therefore form a conical opening for the pipeline P though the opening in the shells is substantially larger than the outside diameter of the pipeline. The slips 48.21 are similar to conventional slips used in oil drilling operation and are designed for any particular pipe diameter. They are placed between the pipeline and the conical clamp half shells 48.14.1 and 48.14.2. The engagement latch 48.16 when actuated by the lever 48.17 secures half shell 48.14.1 to the stationary half shell 48.14.2. When the latch is locked in place, the half shells squeeze the slips close together to securely lock onto the pipeline P and hold the pipeline in place.

After pipeline tension is removed, the A&R clamp 48 receives the full load of the string of pipe P. The pipeline is cut and an abandonment head 48.22 is welded to the tip of the pipe P. An A&R cable 48.23 is secured to the abandonment head 48.22. The A&R cable then being attached to the abandonment head receives the weight of the line when the clamp-releases and allows the lowering of the line to the sea bottom. The A&R cable 48.23 is held in position and weaved around sheave 48.24.

The A&R clamp 48 is moved into and out of position by reason of hydraulic ram 48.25 that is articulated at each end 48.26 on the edge of the support arm 48.1 and at the other end pivoted at 48.27. Thus action by ram 48.25 pivots the A&R clamp 48 about pivot 48.6 and articulation joint 48.27 into and out of engagement with the pipeline. Of course for such movement to occur the engagement latch 48.16 must be open. Also the action by the principal rams 48.8 raise and lower into and out of engagement not only the A&R clamp 48 but also the support arm 48.1 as previously described.

It is believed that the invention has been completely and adequately described and that the scope of the invention should be limited solely by the following claims wherein I claim:

1. The method of vertical reel pipelaying from a vessel onto a seabed comprising:

providing a vertical pipe storage reel for rotation about a horizontal axis on a vessel, having pipe wound therearound, positioning a vertical aligner wheel on said vessel for rotation about a horizontal axis, unreeling pipe from said reel over the rim of said aligner wheel, straightening said pipe by applying forces only upon the side of said pipe remote from said aligner wheel, at least one of said forces being applied to said pipe opposite to and during contact of said pipe with said aligner wheel, and at least one of said forces being applied to said pipe after pipe take off from said aligner wheel.

2. The method of claim 1, including, continually adjusting said aligner wheel athwartship to align said wheel with the pipe take off from the reel.

3. The method of claim 1 including, pivoting said aligner wheel about a remote horizontal axis, and varying the take off angle of the pipe from the aligner wheel to the seabed.

4. The method of claim 1 including, passing the pipe from the aligner wheel through a moon pool positioned forwardly of said aligner wheel.

* * * * *